United States Patent [19]

Ghatas

[11] 4,168,970

[45] Sep. 25, 1979

[54] PURIFICATION OF ZINC SULPHATE SOLUTIONS

[75] Inventor: Nassef E. Ghatas, Valleyfield, Canada

[73] Assignee: Noranda Mines Limited, Toronto, Canada

[21] Appl. No.: 944,352

[22] Filed: Sep. 21, 1978

[51] Int. Cl.$^2$ .................. C22B 15/12; C22B 17/00; C22B 23/04

[52] U.S. Cl. ................................ 75/109; 75/117; 75/119; 75/121; 423/101

[58] Field of Search ............... 75/109, 120, 117, 119, 75/121; 423/101

[56] References Cited

U.S. PATENT DOCUMENTS

| | | | |
|---|---|---|---|
| 3,826,648 | 7/1974 | Bodson | 75/109 |
| 4,049,514 | 9/1977 | Freeman | 75/109 |

*Primary Examiner*—G. Ozaki
*Attorney, Agent, or Firm*—Finnegan, Henderson, Farabow & Garrett

[57] ABSTRACT

A method is provided for purifying zinc sulphate solutions containing copper, cadmium and cobalt impurities, which comprises, in a first stage, treating the impure zinc sulphate solution with zinc dust and an antimony and/or arsenic compound so as to form a cement containing essentially all the copper and cadmium and a portion of the cobalt and separating this cement from the partially purified solution, then, in a second stage, treating the partially purified solution with zinc dust and an antimony and/or arsenic compound to form a cement containing essentially metallic zinc as well as the remaining cobalt and other incidental impurities and separating this cement from the purified solution and recycling at least the major portion of this cement to the first stage where it is used instead of zinc dust to effect further treatment of a fresh impure zinc sulphate solution. The purified solution from the second stage may also be subjected to a third purification stage for control purposes. This method provides an improved procedure for the purification of zinc sulphate solutions.

12 Claims, 3 Drawing Figures

PURIFICATION OF ZINC SULPHATE SOLUTIONS

This invention relates to a method for purifying zinc sulphate solutions containing copper, cadmium and cobalt as major impurities and particularly for purifying zinc sulphate solutions obtained from leaching zinc calcines.

In the process of electrowinning zinc, a zinc sulphate solution is normally prepared by leaching a roasted zinc sulphide concentrate (also known as zinc calcine) which contains iron compounds and other impurities including copper, cadmium, cobalt, etc. Iron is then precipitated out of the solution by various known procedures, such as oxidation and neutralization techniques, jarosite precipitation or the like. Together with iron, other hydrolysable impurities, such as arsenic and antimony, are also usually removed by these techniques. After this initial removal of iron and other hydrolysable impurities which co-precipitate with iron, the obtained zinc sulphate solution must be further purified to eliminate impurities such as Cu, Cd and Co which are the most important impurities remaining. Other incidental impurities, such as Ni, Ge, etc., may also be present in such solution and they must equally be removed to a satisfactory level. However, the applicant has found that, as a normal practice, when cobalt has been removed to a satisfactory level (usually below 0.1 mg/l), all other impurities are also usually already reduced to an acceptable degree.

It is already known to purify zinc sulphate solutions by first removing Cu and Co by cementation with zinc dust at elevated temperatures (preferably above 90° C.) in the presence of arsenic or antimony compounds and of $CuSO_4$ and then by removing Cd by cementation with zinc dust and $CuSO_4$ at relatively low temperatures (preferably below 80° C.). This conventional method has several disadvantages. First, this is a batch process. Also, it utilizes great amounts of metallic zinc in the form of zinc dust, which must consequently be removed from production and transformed into dust for use in the purification treatment. Moreover, it utilizes substantial amounts of $CuSO_4$ and requires stringent operating controls in order to avoid Cd cementation in the first stage of the operation where Cu and Co are eliminated. Normally, however, at least some Cd, and often a substantial proportion thereof, is co-precipitated with Cu and Co in the first stage of the operation and constitutes an important commercial loss.

More recently, a continuous purification method has been disclosed in U.S. Pat. No. 3,826,648 of July 30, 1974, issued to SOCIETE DES MINES ET FONDERIES DE ZINC DE LA VIEILLE MONTAGNE, according to which Cu and Cd are first eliminated by precipitation with excess zinc dust and then Co as well as other incidental impurities are removed by cementation with zinc dust and an antimony compound at an elevated temperature between 80° C. and the boiling point of the solution. Although this method avoids the use of $CuSO_4$ it still requires great amounts of zinc dust which must either be purchased or removed from production, as already indicated above.

It is an object of the present invention to provide an improved purification process for zinc sulphate solutions.

A further object of the present invention is to provide a continuous purification process for zinc sulphate solutions in which the impurities are satisfactory removed, while producing only one cake for further treatment.

A still further object of the present invention is to provide a method in which the cake or cement obtained at the end of the purification system can be recycled to the beginning of the system and reused instead of the zinc dust, thereby reducing the amount of zinc dust required and increasing the final overall zinc production.

Other objects and advantages of the present invention will be made apparent from the following more detailed description thereof.

Basically, this invention provides a method for the purification of zinc sulphate solutions containing copper, cadmium and cobalt as major impurities, which comprises:

(a) in a first stage, treating the impure zinc sulphate solution with zinc dust, so as to form a cement containing essentially all the copper and cadmium and a portion of the cobalt and separating said cement from such partially purified solution;

(b) in a second stage, treating said partially purified solution with zinc dust in the presence of an antimony and/or arsenic compound, to form a cement containing essentially zinc as well as the remaining cobalt and other incidental impurities and separating said cement from the purified solution; and (c) recycling at least the major portion of said cement from the second stage to the first stage to be used therein instead of zinc dust for the treatment of a fresh impure zinc sulphate solution.

The amount of the zinc reagent (zinc dust and/or recycled cement) to be used in the first stage of this purification system and the amount and type of the antimony or arsenic compound, can be readily determined and controlled by those familiar with the art to achieve an essentially complete copper and cadmium precipitation together with a portion, preferably up to 75% of the cobalt cementation during the first stage treatment. It has been found, for example, that between about 2 and 5 grams of zinc dust or recycled cement (on dry basis) per liter of impure feed solution are satisfactory for the treatment in the first stage. Initially, zinc dust is introduced into the first stage; however, as soon as the recycling of the second stage cement commences, very little, if any, additional zinc dust would be required. The antimony is normally used in the form of antimony oxide $Sb_2O_3$, however, antimony salts, such as that of potassium and even pure antimony metal powder are also suitable and all these reagents are included within the meaning of "antimony compound." The amounts of the antimony compound can also be readily determined by those familiar with the art to effect the desired cementation of substantially all Cu and Cd and of a portion of Co (which should be as large as possible) in the first stage of the purification treatment. The applicants have found, for example, that between about 0.1 and 1.0 mg of $Sb_2O_3$ per liter of impure feed solution is a suitable amount for the first stage operation. Instead of the antimony compounds, arsenic compounds, such as $As_2O_3$, can also be used. The amount of this compound is again such as to remove a portion of Co together with substantially the totality of Cu and Cd. The applicant found that it is economically more advantageous to use $Sb_2O_3$ rather than $As_2O_3$. Arsenic compounds will only be used if the antimony compounds become, for some reason, too expensive or unavailable. Obviously, a suitable mixture of an arsenic and an antimony compound could also be employed.

The first stage purification treatment is carried out under normal agitation (about 40–50 rpm) and preferably at a temperature of between about 50° C. and 80° C. The pH of the solution is also normally maintained between about 4 and 5, preferably between 4.4 and 4.8. The desired pH value can be maintained by addition of spent electrolyte into the first stage of the purification system. These conditions are, however, not restrictive since they depend on many factors, such as the type and amounts of the antimony compound added, the type of solution to be purified, the time used to achieve such purification, etc. A man of the art will be able to select the most appropriate temperature and pH conditions for his specific operation to achieve essentially total removal of Co and Cd impurities and a portion (preferably as high as possible) of the cobalt in the first purification stage.

The first stage purification treatment is normally carried out on a continuous basis in a plurality of tanks. For instance, three tanks may be used for this purpose with the impure feed and other reagents being preferably introduced into the first tank which would overflow into the second tank which, in turn, would overflow into the third tank. The first stage purification treatment would proceed in all three tanks on a continuous basis taking from about one to three hours. Obviously, if it is found desirable, some of these reagents can also be introduced into tanks other than the first.

Then, a liquid-solid separation is effected to remove the obtained cement from the partially purified solution. This is normally done by transferring the first stage mixture into suitable thickeners from which the underflow is filtered, for instance, in vacuum drum filters such as Dorrco filters, to remove the solids from the filtrate. The overflow from the thickeners, as well as the filtrate from the filters are then sent to the second stage purification treatment. The second stage purification treatment is carried out in the presence of zinc dust and an antimony or arsenic compound to remove the remaining impurities to a satisfactory level. The amount of zinc dust added should again be in excess with respect to the impurities present and will normally be in the same concentration range as in the first stage or slightly greater. For example, between 3 to 7 g of zinc dust per liter of the partially purified solution entering the second stage has been found satisfactory. The amount of the antimony compound or arsenic compound is also preferably slightly higher than in the first stage and, for instance, between 0.4 and 2.0 mg of $Sb_2O_3$ per liter has been found quite adequate. With respect to the amounts of these ingredients to be added in the second stage, the same general considerations, as discussed above with reference to the first stage, also apply, namely the man of the art will have no difficulty in adjusting and controlling these amounts to satisfy his specific requirements.

The temperature of the second stage operation is normally higher than that of the first stage and temperatures between 85° C. and the boiling point of the solution have been found to be quite suitable. The pH is very similar to the one used in the first stage, namely between about 4 and 5, preferably between 4.1 and 4.7. This pH may again be adjusted by addition of spent electrolyte if this becomes necessary. The second stage operation is also usually conducted in a plurality of tanks with suitable agitation (about 40–50 rpm) and on a continuous basis. The total time of the second stage purification treatment is usually between about 2 and 5 hours. The various tanks, just as in the first stage, are normally connected in series.

The mixture obtained from this second stage purification treatment is then forwarded to a liquid-solid separation step. The solids from this liquid-solid separation, for instance in the form of a cake, are then recycled back to the first stage purification treatment for treating freshly introduced impure feed. The liquid phase from this liquid-solid separation should normally be sufficiently pure to be used in the electrowinning of zinc.

If, however, the solution from the second stage purification treatment is found to be insufficiently pure to be used as electrolyte, or in order to provide a better control of the final electrolyte solution, an optional third purification stage can be carried out, in which the solution from the second stage is again treated before it is sent to electrolysis. This final treatment stage can normally be considered as a control stage and it is highly preferred to incorporate it as part of the process of the present invention. The operating conditions of this third control stage can be adjusted in such a way as to effect the final impurity control of the electrolyte. Thus, if it is found that the solution from the second stage purification treatment still contains some impurities, then it can further be treated in the third stage to remove these impurities to an acceptable level.

For instance, if it is found that the solution from the second stage purification treatment still contains cobalt over the desired limit, it can be removed by addition of zinc dust at a temperature of between about 70° and 90° C. and a pH of between about 3 and 5 in the third stage. After completion of the third stage purification treatment, which will normally be carried out in only one tank, a liquid-solid separation will again be effected and the solids which will contain at least 95% of zinc, will be recycled back to the first stage, together with the solids from the second stage, to be used there instead of zinc dust. It should be noted that it is preferred to recycle all the solids from the second stage purification treatment and all the solids from the optional third stage purification treatment back to the first stage purification treatment where they are reused instead of zinc dust. However, if, for some reason, it is desired to withhold some of these solids from the second and third stages and add zinc dust instead into the first stage, this obviously can be done. Also, the solids from the third stage could be recycled back into the second stage rather than the first. However, at least the major proportion of the solids from the second and third stages should be recycled in order to obtain the desired advantageous effect of the present invention, namely the saving in zinc dust consumption and the increase of the overall capacity of electrolytic zinc production.

The invention will now further be described with reference to the appended drawings in which.

Figure 1:
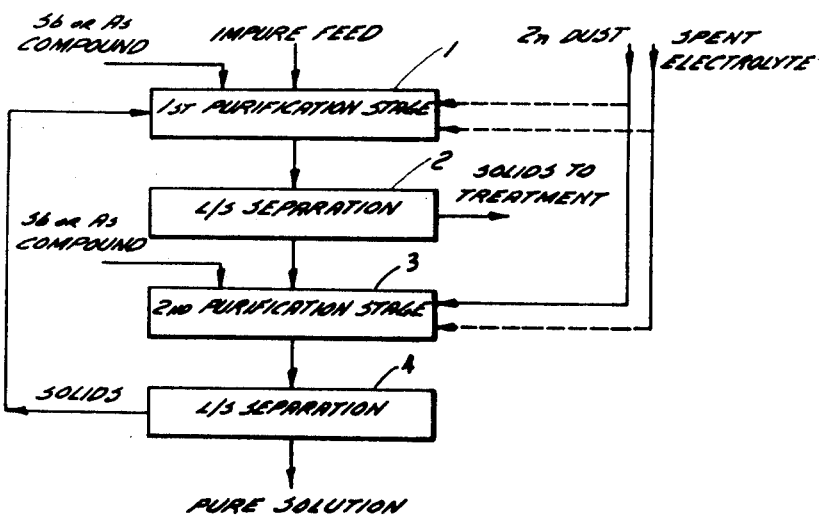
FIG. 1 is a flow sheet of the basic embodiment of the present invention using a two stage purification system.

According to FIG. 1, the impure zinc sulphate solution feed containing Cu, Cd and Co as major impurities is treated in the first purification stage 1. In addition to the impure feed, there is introduced into this first stage zinc dust and an antimony or arsenic compound. As the process proceeds, zinc dust is replaced by the cement cake from the following purification stage, which is recycled back to the first stage. If desired, a minor proportion of additional zinc dust can always be introduced into the first purification stage.

This first purification stage 1 is carried out under such operational conditions that essentially all copper and cadmium impurities as well as a substantial portion of the cobalt impurity are coprecipitated.

Then, a liquid-solid separation step 2 is effected and the solids from this liquid-solid separation, which contain essentially all copper and cadmium as well as a portion of the cobalt, are treated separately in a known manner to extract cadmium while also producing a copper cake containing some cobalt in it. This copper cake may be treated, in a known manner, to extract copper and cobalt or it can be sent to a copper smelting operation. These additional treatments of solids or cakes are well known in the art and they do not form an actual part of the present invention except to the extent that these are the only solids produced according to this invention which require further treatment.

The liquid phase from the liquid-solid separation step 2 is then treated in the second purification stage 3 with appropriate addition of zinc dust and an antimony or arsenic compound to remove cobalt to a satisfactory level. Spent electrolyte may also be added to either stage for pH control. Then, another liquid-solid separation step 4 is effected in such a way that the final solution resulting therefrom is essentially free of solids. The solid phase from this step is recycled back to the first stage 1 to be used therein as the zinc reagent and the liquid phase constitutes a pure solution suitable for electrolysis.

Figure 2:
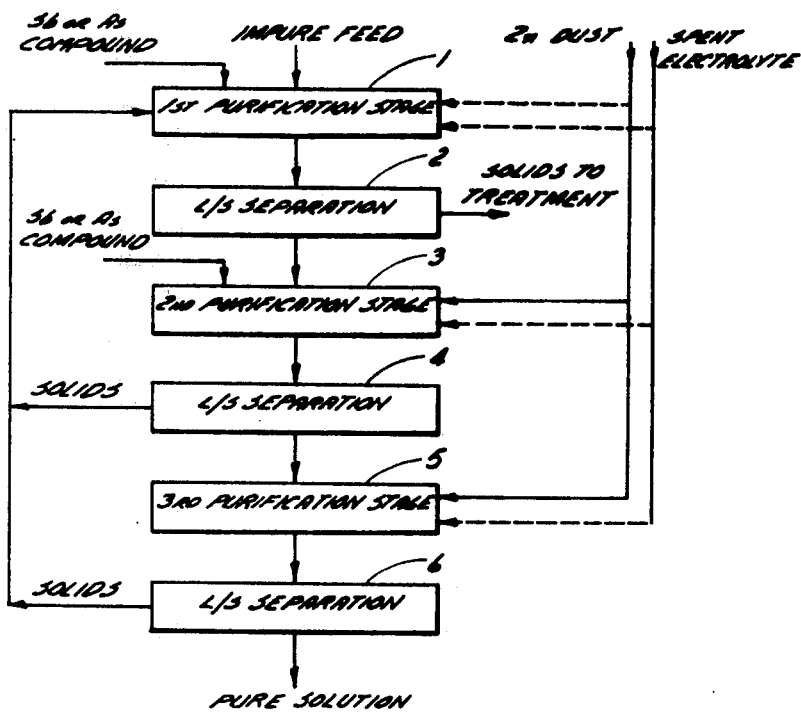
FIG. 2 is a flow sheet of a preferred embodiment of the present invention having a third stage purification treatment.

In the embodiment of FIG. 2, the first purification stage 1 and the liquid-solid separation step 2, as well as the second purification stage 3, are basically identical to the same procedures described with reference to FIG. 1. The liquid-solid separation step 4 can be effected by using cyclones, thickeners or presses. However, the liquid phase from the liquid-solid separation 4 is then treated in a third purification stage 5. In this case, the third stage treatment is effected only with zinc dust and is followed by a liquid-solid separation step 6 from which the solids are recycled back to the first purification stage 1 and the liquid phase, which should be essentially free of solids, constitutes the pure solution suitable for electrolysis.

Figure 3:
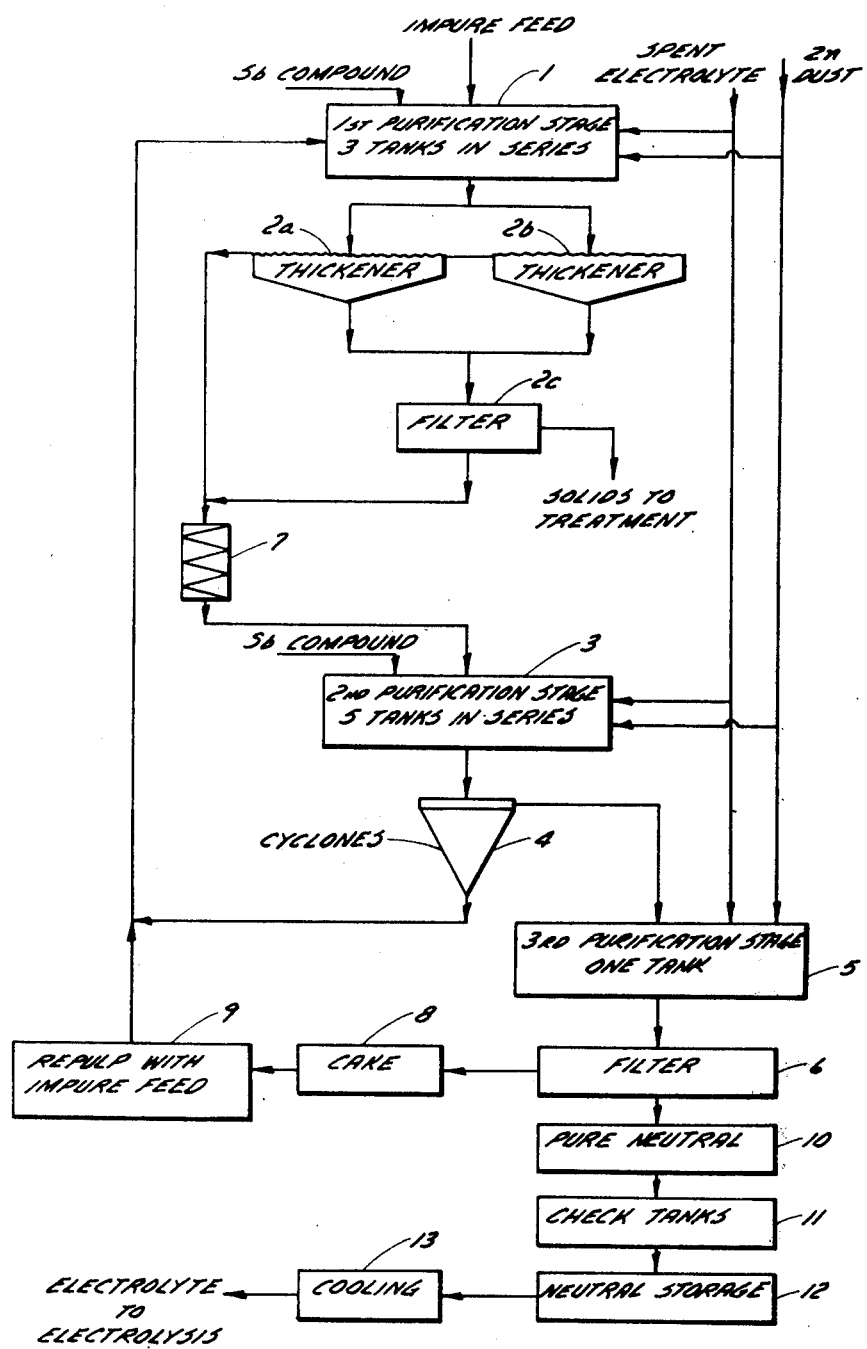
FIG. 3 is a more detailed flow sheet of the system as it has been designed by the applicant.

FIG. 3 represents a flow sheet of a specific but non-limitative example which will now be described in greater detail.

EXAMPLE

The impure feed is introduced into the first purification stage 1 which consists of three tanks connected in series. The impure feed is introduced continuously into the first tank at the rate of 1000–1500 U.S. gallons per minute. This impure feed has the following typical analysis of zinc and impurities:
  Zn: 140–150 g/l
  Cu: 300–800 mg/l
  Cd: 400–1000 mg/l
  Co: 2–12 mg/l
the remainder being other incidental impurities that may be present in the zinc sulphate solution.

Initially, with the impure feed, there is introduced into the first tank of the first purification stage 1 some 25–35 short tons per day of zinc dust and 4–5 lbs per day of $Sb_2O_3$ as well as a necessary volume of spent electrolyte consisting essentially of about 60 g/l of Zn and 185–200 g/l of $H_2SO_4$ to maintain the pH at the desired value. After the initial treatment, basically no new zinc dust is introduced into the first purification stage 1, but instead solids from the second purification stage are recycled back into stage 1.

The overall treatment in the three tanks of the first purification stage 1 lasts approximately two hours and the obtained mixture is then forwarded to thickeners 2a and 2b in which the initial liquid-solid separation is effected. The underflow from the thickeners which has a solids content of about 200 g/l is filtered preferably in vacuum drum filters 2c of Dorrco type to remove solids for further treatment while the filtrate together with the overflow from the thickeners pass through the heat exchanger 7 in which they are heated to over 90° C. and constitute the partially purified solution which is conducted to the second purification stage 3. Zinc dust is introduced into this second purification stage 3 at a rate of about 30–40 short tons per day and spent electrolyte may be introduced at a variable rate for pH control. $Sb_2O_3$ is introduced into this second stage at a rate of 8 to 10 lbs/day.

The second purification stage 3 preferably consists of five tanks connected in series and the total time of the second stage purification treatment is between about 2.5 and 3.5 hours. The pH of the second stage is controlled between 4.1 and 4.7.

The mixture from the second purification stage 3 is conducted through liquid-solid separation cyclones 4 from which the overflow is forwarded to the third purification stage 5 and the underflow having a solids content of 40 to 50 g/l is sent back to the first stage 1.

The retention time in the third purification stage 5, which is normally carried out in one tank, is usually less than one hour and in addition to the overflow from the cyclones 4 there is also added to this stage zinc dust in an amount of 5–10 tons per day and spent electrolyte to maintain the pH between about 3 and 5.

After the third purification stage, the obtained mixture is subjected to liquid-solid separation in filter presses 6. From these filter presses, the cake 8 amounting to about 5 to 10 short dry tons per day is repulped at 9 with impure feed and sent back to the first purification stage 1. The liquid phase from the filter presses 6 constitutes the so-called "pure neutral" solution 10 which is forwarded to check tanks 11 and then to neutral storage 12 from which the electrolyte for zinc electrolysis is withdrawn after cooling at 13.

The range of solids analysis from the first purification stage 1 was found to be:
  25 to 45% Zn
  8–15% Cu
  10–24% Cd
  about –0.1% Co.

The typical impurity content of the filtrate after the first purification stage contained:
  less than 1 mg/l Cu
  0.1–1.5 mg/l Cd
  0.01–0.02 mg/l Sb
  0.5–2.5 mg/l Co.

After the second stage purification, the impurity content of the cyclones overflow analysed typically:
  less than 0.4 mg/l Cu
  less than 0.5 mg/l Cd
  less than 0.1 mg/l Co about 0.01 mg/l Sb.

The solids (dry basis) analysis of the underflow solids was typically:

93–98% Zn
0.2–0.3% Cu
0.3–0.4% Cd
0.02–0.05% Co.

After the optional third stage, the analysis of the final solution was substantially similar to that of the overflow solution from cyclone 4. Only slightly better purity was achieved. The cake 8 contained over 95% zinc.

It is also possible to add to any purification stage some $CuSO_4$ if this is required to improve the cementation of impurities. Under certain conditions, it is known that to eliminate "dragging" of Cd that may still remain, some copper should be added and such copper can be added in the form of $CuSO_4$ crystals or solution. When desired, a concentration of $CuSO_4$ of about 10–30 mg/l has been found quite adequate. However, this is only an optional measure and not an essential feature of the present invention.

Thus, basically, the idea behind applicant's improved process is to remove all impurities progressively at the various stages of the purification treatment. This can be done in a continuous operation while recycling to the first stage at least the major part and preferably all the solids from subsequent stages, these solids to be used in the first stage instead of zinc dust for purification of a fresh impure solution. In view of the fact that these solids from subsequent stages are not in the form of pure metallic zinc but contain zinc in a proportion of about 90 to 98%, the applicant was concerned that some of the impurities present in the solids, particularly after the second stage purification treatment, would be reintroduced back into the first stage and would thereby increase the total impurities and be detrimental to the overall purification process. This concern proved to be unjustified since a pilot plant operation of the process carried out at Canadian Electrolytic Zinc Limited, Valleyfield, Quebec, clearly demonstrated that no adverse effect occurred on the final electrolytic solution due to the recycle of the solids from the second and eventual third stages back to the first purification stage.

It is clear also that the novel process is simple, versatile and efficient. Obviously, the two or three stages of the process can be monitored as desired to remove most effectively the various impurities. If, for some reason, some other reagents or ingredients need to be added in such purification system, they can readily be added at any desired stage, and the various conditions can be appropriately controlled at the various stages to achieve optimum purification results. It is, therefore, believed that the novel method produces a clear advance in the art of purification of zinc sulphate solutions.

What is claimed is:

1. Method for the purification of zinc sulphate solutions containing copper, cadmium and cobalt as major impurities, which comprises:
   (a) in a first stage, treating the impure zinc sulphate solution with zinc dust and an antimony and/or arsenic compound so as to form a cement containing essentially all the copper and cadmium and a portion of the cobalt, and separating said cement from such partially purified solution;
   (b) in a second stage, treating said partially purified solution with zinc dust and an antimony and/or arsenic compound to form a cement containing essentially zinc as well as the remaining cobalt and other incidental impurities and separating said cement from the purified solution; and
   (c) recycling at least the major portion of said cement from the second stage to the first stage to be used therein instead of zinc dust for the treatment of a fresh impure zinc sulphate solution.

2. Method according to claim 1, wherein the purified solution from the second stage is further subjected to a third purification stage wherein a cement is formed comprising at least 95% zinc, said cement being then separated from the obtained pure solution and at least the major portion thereof being recycled back to the first or second stage to be used therein instead of zinc dust.

3. Method according to claim 2, wherein essentially all the cement from the third purification stage is recycled back to the first stage.

4. Method according to claim 2, wherein the third purification stage is used as a control stage for specifically removing any impurity that may not have been adequately removed in the previous stages.

5. Method according to claim 1, wherein essentially all the cement from the second stage is recycled back to the first stage.

6. Method according to claim 1, wherein the first stage treatment is carried out at a temperature between about 50° C. and 80° C. and a pH of between about 4 and 5.

7. Method according to claim 1, wherein the first and second stage treatments are carried out with addition of $Sb_2O_3$, an antimony salt or antimony metal powder as the antimony compound.

8. Method according to claim 1, wherein the first stage treatment is carried out with addition of about 0.1–1.0 mg of $Sb_2O_3$ as the antimony compound per liter of impure feed solution.

9. Method according to claim 1, wherein the second stage treatment is carried out at a temperature between about 85° C. and the boiling point of the solution and a pH of between about 4 and 5.

10. Method according to claim 1, wherein the second stage treatment is carried out with addition of about 0.4–2.0 mg of $Sb_2O_3$ as the antimony compound per liter of solution.

11. Method for the purification of zinc electrolytes which comprises:
   (a) in a first stage, treating under agitation the impure electrolyte with zinc dust and an antimony compound at a temperature in the range of about 50° C. to 80° C. and while keeping the pH between about 4 and 5, until essentially all copper and cadmium and a substantial portion of cobalt are cemented as solids, and separating said solids from such partially purified electrolyte;
   (b) in a second stage, treating under agitation said partially purified electrolyte with zinc dust and an antimony compound at a temperature between about 85° and 100° C. and while keeping the pH between about 4 and 5, until the remaining impurities are cemented as solids and separating said solids from the purified electrolyte;
   (c) recycling the solids from the second stage to the first stage to be used therein for the treatment of a fresh impure electrolyte;
   (d) in a third stage, treating the purified electrolyte with zinc dust at a temperature of between about 70° and 90° C. and a pH of between about 3 and 5 to form a cement containing at least 95% zinc and separating said cement from the pure electrolyte; and
   (e) recycling the cement from the third stage to the first or second stage.

12. Method according to claim 11, comprising carrying out said purification in a continuous operation.

* * * * *